Patented Mar. 6, 1951

2,544,068

UNITED STATES PATENT OFFICE 2,544,068

CHROMABLE AZO DYESTUFFS

Achille Conzetti and Guido Schetty, Basel, Switzerland, assignors to J. R. Geigy A.-G., Basel, Switzerland, a Swiss firm No Drawing. Application December 19, 1945, Serial No. 636,062. In Switzerland December 21, 1944

8 Claims. (Cl. 260—150)

We have found that valuable chromable azo dyestuffs are obtained by combining in an alkaline medium diazotised aromatic amines which contain lake-forming groups and may also contain azo groups, with coupling components of the general formula

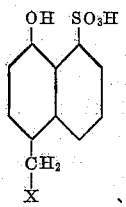

wherein X means hydrogen or a phenyl radical, which can be substituted, and treating the so-obtained azo dyestuffs, which correspond to the formula

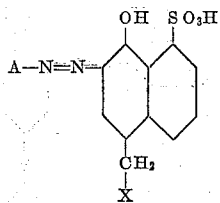

wherein A—N=N— represents the radical of a diazotised amine of the benzene or naphthalene series which contains a lake-forming group, preferably in o-position to the amino-group, and X stands for hydrogen or a radical of the benzene series, on the fibre or in substance with chrome-yielding agents.

By the term "aromatic amines containing lake-forming groups and possibly also azo groups" may be understood compounds which contain a hydroxyl, a carboxyl, or an alkoxy group in o-position to the amino group or which contain the salicylic acid grouping. Thus may be enumerated, by way of example only: o-aminophenols, o-aminonaphthols, o-aminobenzene carboxylic acids, o-aminonaphthalene carboxylic acids, o-amino alkoxybenzenes, such as o-aminomethoxy-, -ethoxy- or propyloxybenzenes and so on. These compounds may be further substituted in any way, for instance by alkyl, nitro, sulfonic acid groups or by halogen.

The coupling components corresponding to the above formula are made according to U. S. patent application Ser. No. 634,151 filed on December 10, 1945, now U. S. Pat. No. 2,451,579.

The production of the chrome complex compounds can be carried out according to known methods, such as for instance by heating the dyestuffs with chrome-yielding agents, e. g. also with salicylic acid chromium complex compounds in a neutral, acid or alkaline medium, but also in organic solvents, in organic bases, in carboxylic acid amides or corresponding ammonium salts; it is also possible to work with a reduced pressure. The chromation on the fibre may also be carried out according to known methods, for example according to the one-bath chroming method, by an after-chroming method, etc.

The dyeings obtainable with the chromed dyestuffs of the present invention as well as the dyeings chromed on the fibre give pure violet, green, blue to grey shades and are distinguished by a good color in artificial light. The chromium complex compounds possess the advantage of dyeing uniformly and in a level manner mixtures of loose wool of different origin.

The following examples will illustrate, but not limit the invention. The parts are by weight.

Example 1

20.8 parts of 4-chloro-1-aminobenzene-3-sulfonic acid are diazotised and coupled in a slightly acid medium with 12.3 parts of 4-methyl-2-amino-1-hydroxybenzene in the presence of sodium thiosulfate and sodium acetate. This monoazo dyestuff is diazotised in the usual manner, the isolated diazo compound is stirred in 200 parts of water and the obtained suspension is poured into a solution of 26 parts of 4-methyl-1-hydroxynaphthalene-8-sulfonic acid in 300 parts of water, 30 parts of anhydrous sodium carbonate and 30 parts of pyridine. After completion of the dyestuff formation, the whole is heated to 50° C. and the dyestuff precipitated in a crystalline form after addition of sodium chloride is filtered by suction and dried. The new dyestuff, a blue black powder which corresponds to the formula

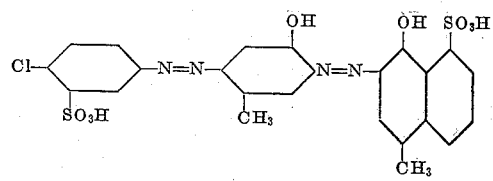

dyes wool from an acid bath in violet shades which are converted into clear green shades of very good appearance in artificial light after the after-chroming. The dyeings are very fast to

Example 2

29.5 parts of 6-nitronaphthalene-1:2-diazoxide-4-sulfonic acid are introduced, while stirring, into a solution of 27.3 parts of sodium 4-methyl-1-hydroxynaphthalene-8-sulfonate in 200 parts of water and 20 parts of 30% caustic soda lye. After completion of the dyestuff of the formula

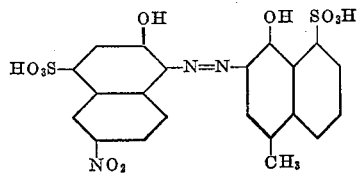

formation the mixture is neutralised with hydrochloric acid, the dyestuff filtered, suspended in 1000 parts of hot water, treated with 200 parts of a chromium sulfate solution corresponding to 10 parts of chromium sesquioxide and heated for 24 hours to boiling. First a clear, green blue solution is formed, from which the chrome complex dyestuff begins to separate in a crystalline form. The latter is filtered off after cooling and dried. Thus a bronzy powder is obtained which dyes wool from a sulfuric acid bath in clear, bluish green shades. The dyeings are distinguished by an excellent color in artificial light and by a very good evenness.

Example 3

10.9 parts of 2-amino-1-hydroxybenzene are diazotised and the solution of the diazo compound is poured into a solution of 27.3 parts of sodium 4-methyl-1-hydroxynaphthalene-8-sulfonate in 300 parts of water, 10 parts of anhydrous sodium carbonate and 40 parts of pyridine. The whole is heated to 35° C. and stirred until the diazo compound has disappeared. The formed dyestuff of the formula

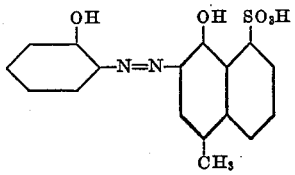

crystallizes in aggregates of golden-chafer brilliancy. The same is filtered off still warm, then it is suspended in 1500 parts of water and, after addition of a solution of ammonium-chromium-salicylate corresponding to 9.1 parts of chromium sesquioxide, heated to boiling for 20 hours. The chrome containing dyestuff crystallizes partly already in the heat. Its precipitation is completed by addition of sodium chloride, then it is filtered and dried. The new dyestuff, a violet powder, dyes wool from a formic acid bath in very even, violet shades.

Example 4

13.7 parts of 2-aminobenzoic acid are diazotised and the acidity of the obtained diazo solution decreased to Congo violet reaction, by means of sodium bicarbonate. At 0-5° C. the diazo compound is allowed to run into a solution of 26 parts of 4-methyl-1-hydroxynaphthalene-8-sulfonic acid in 500 parts of water and 10 parts of anhydrous sodium carbonate. After a few hours the dyestuff formation is complete. The precipitated dyestuff of the formula

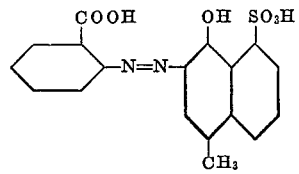

is filtered off, dissolved in 800 parts of water and, after addition of 240 parts of a solution of ammonium-chromium-salicylate corresponding to 9.1 parts of $Cr_2O_3$, heated to boiling for several hours. The violet solution thus formed is filtered still hot in order to remove any insoluble crystalline precipitate, whereupon the filtrate is salted out by means of 270 parts of sodium chloride; then the dyestuff precipitated in a powdery form is filtered off and dried. The new chrome-containing dyestuff, a violet powder, dyes wool from a formic acid bath in very clear, violet shades. The dyeings are distinguished by an excellent evenness.

Example 5

15.4 parts of 5-nitro-2-amino-1-hydroxybenzene are diazotised and the acidity brought to Congo violet reaction by addition of sodium bicarbonate. At 0-5° C. the diazo compound is poured into a solution of 35.3 parts of sodium 4-benzyl-1-hydroxy naphthalene-8-sulfonate in 300 parts of water, 30 parts of pyridine and 12 parts of anhydrous sodium carbonate. After about 4 hours the dyestuff formation is complete. The dyestuff precipitated in a bronzy form is filtered by suction, washed with a sodium chloride solution and dried. The new dyestuff, a dark blue powder which corresponds to the formula

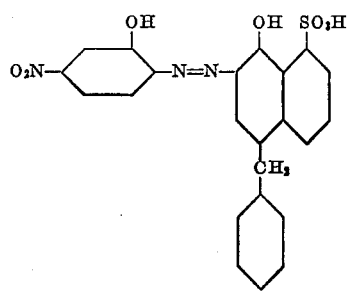

dyes wool from an acid bath in bluish-red shades. When after-chromed these dyeings are convered into very clear, blue green shades of very good shade in artificial light. Besides the so-obtained dyeings are distinguished by good fastness properties in the moist state and by a good light-fastness.

Somewhat greener dyestuffs are obtained by using 4-(4'-methoxy)-benzyl-1-hydroxynaphthalene-8-sulfonic acid instead of 4-benzyl-1-hydroxynaphthalene-8-sulfonic acid.

Example 6

16.8 parts of 6-nitro-2-amino-4-methyl-1-hydroxybenzene are diazotised, the acidity being decreased to Congo violet reaction by means of sodium bicarbonate. The diazo compound is poured into a solution of 27.3 parts of the sodium salt of 4-methyl-1-hydroxynaphthalene-8-sulfonic acid in 400 parts of water, 10 parts of anhydrous sodium carbonate and 26 parts of pyridine. After a few hours the dyestuff formation is complete. Then there is heated to 60° C., the beautifully crystalline dyestuff of the formula

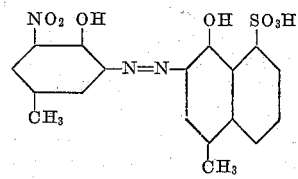

is filtered off still hot, stirred in 1000 parts of water, treated with 240 parts of a solution of ammonium-chromium-salicylate corresponding to 9.1 parts of chrome oxide, and then heated for 25 hours to boiling. Now, 40 parts of sodium chloride are added, the chrome complex compound is filtered still hot and dried. Thus a grey black powder is obtained which dyes wool from a formic acid bath in clear, greenish grey shades of excellent evenness. The dyeings possess an excellent shade in artificial light.

*Example 7*

The suspension of the diazo compound obtained from 15.4 parts of 5-nitro-2-amino-1-hydroxy-benzene and brought to Congo violet reaction by addition of sodium bicarbonate is poured into a solution of 39.4 parts of 4-(4'-hydroxy-3'-carboxy)-benzyl - 1-hydroxynaphthalene-8-sulfonic acid, 16 parts of anhydrous sodium carbonate in 100 parts of water and 10 parts of pyridine. After completion of the dyestuff formation acetic acid is added until acid reaction to litmus has been reached. Then 20 parts of sodium chloride are added, the separated dyestuff filtered off, purified by dissolving it in water and reprecipitating by means of sodium chloride. Thus a dyestuff which corresponds to the formula

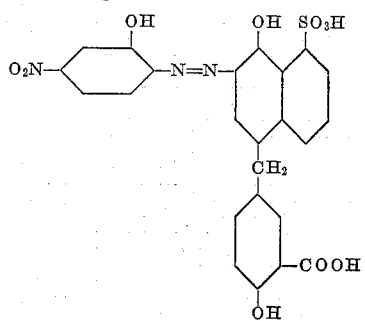

is obtained which dyes wool according to the after-chroming method in blue green shades of very good fastness properties to milling, potting alkali and to light. The dyeings possess an excellent shade in artificial light.

*Example 8*

14.4 parts of 4-chloro-2-amino-1-hydroxybenzene are diazotised in the usual manner and then combined in a soda alkaline solution with 27.3 parts of the sodium salt of 4-methyl-1-hydroxynaphthalene-8-sulfonic acid. After completion of the dyestuff of the formula

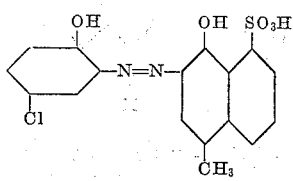

formation the azo dyestuff is isolated, heated in water with an alkali chromite solution from 100 parts of chromium hydroxide paste (corresponding to 17.4 parts of $Cr_2O_3$) and 60 parts of caustic potash lye, until the dyestuff is completely chromed. Then the whole is diluted with water and neutralised with mineral acid, the chrome complex compound being finally precipitated by means of a little sodium chloride.

The dyestuff thus obtained dyes wool from an acid bath in even, fast and flowery navy-blue shades.

*Example 9*

20.3 parts of 2-amino-1-methoxybenzene-4-sulfonic acid are diazotised and then coupled in a soda alkaline solution with 33 parts of 4-benzyl-1-hydroxynaphthalene-8-sulfonic acid. The isolated dyestuff of the formula

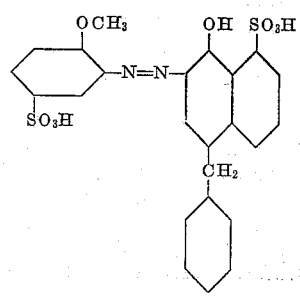

is dissolved in 800 parts of hot water, then a paste of freshly precipitated chromium hydroxide corresponding to 10 parts of chromium sesqui-oxide is added to this solution, whereupon 25 parts of formic acid are added, the whole being then heated in the autoclave for 8 hours to 130° C. The whole is made slightly alkaline by addition of sodium carbonate. Then any chromium residues are filtered off and the chrome containing dyestuff is precipitated from the filtrate by means of sodium chloride. The new dyestuff dyes wool from a formic acid bath in violet blue shades.

*Example 10*

The dyestuff obtainable by coupling 14.4 parts of 4-chloro-2-amino-1-hydroxybenzene with 35 parts of 4-(4'-hydroxy)-benzyl-1-hydroxynaphthalene-8-sulfonic acid in a soda alkaline medium, and corresponding to the formula

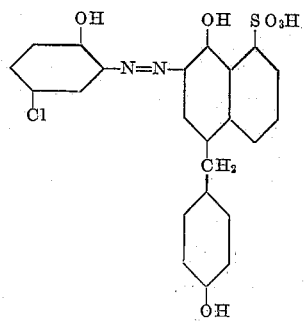

is suspended in 1500 parts of water, treated with a solution of ammonium-chromium-salicylate (corresponding to 9.1 parts of chromium sesqui-oxide) and heated to boiling for 22 hours, whereupon the chrome complex dyestuff is precipitated by addition of 180 parts of sodium chloride, filtered off and dried. Thus a blue violet powder dyeing wool from a formic acid bath in flowery, navy blue shades of a good light-fastness is obtained.

*Example 11*

15.4 parts of 4-nitro-2-amino-1-hydroxybenzene are diazotised, the excess of acid is removed by addition of sodium bicarbonate until a neutral reaction is reached and then the whole is poured into a solution of 28 parts of sodium 4-methyl-1-hydroxynaphthalene-8-sulfonic acid in 500 parts of water, 10 parts of anhydrous sodium carbonate and 30 parts of pyridine. There is then stirred at room temperature until the dyestuff formation has completed; then the mixture is heated to 70° C., treated with sodium chloride until complete precipitation of the dyestuff has been reached and filtered off. The dyestuff of the formula

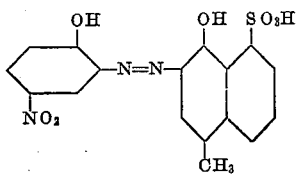

is stirred in 1500 parts of water, treated with a solution of ammonium - chromium - salicylate (corresponding to 9.9 parts of chromium sesquioxide) and heated to boiling for 15 hours. A dark violet solution is formed, from which the chrome-containing dyestuff is separated in a finely crystalline form on addition of sodium chloride. The so-obtained dyestuff dyes wool from a formic acid bath in neutral grey shades of very good evenness.

*Example 12*

16.8 parts of 5-nitro-2-amino-4-methyl-1-hydroxybenzene are diazotised and combined in a soda alkaline medium with 25 parts of 4-methyl-1-hydroxynaphthalene-8-sulfonic acid. The so-obtained azo dyestuff of the formula

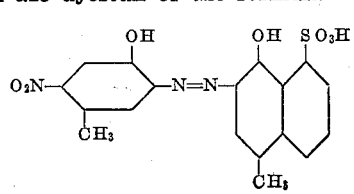

is dissolved in 1500 parts of hot boiling water, treated with a solution of ammonium-chromium-salicylate (corresponding to 9.9 parts of chromium sesquioxide) and stirred for 20 hours at boiling temperature. The chrome containing dyestuff is isolated by addition of sodium chloride. After drying it is a dark violet powder dyeing wool from a formic acid bath in very even, flowery, blue green shades of excellent appearance in artificial light.

When in the above example the 5-nitro-2-amino-4-methyl-1-hydroxybenzene is replaced by 5-nitro-2-amino-1-hydroxybenzene, a dyestuff corresponding to the formula

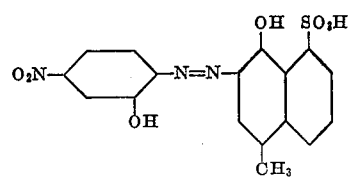

is obtained which produces somewhat greener and purer shades.

In the following table further examples will be enumerated.

*Table*

| No. | Diazo component | Coupling component | Shade of the after-chromed dyeing on wool |
|---|---|---|---|
| 1 | 4-methyl-2-amino-1-hydroxybenzene | 4-methyl-1-hydroxynaphthalene-8-sulfonic acid | blue. |
| 2 | 4-nitro-2-amino-1-hydroxybenzene | do | olive grey. |
| 3 | 4-chlor-5-nitro-2-amino-1-hydroxybenzene | do | green blue. |
| 4 | picramic acid | do | green. |
| 5 | 6-methyl-4-nitro-2-amino-1-hydroxybenzene | do | olive green. |
| 6 | 4-chlor-2-amino-1-hydroxybenzene-6-sulfonic acid | do | greenish blue. |
| 7 | 6-acetylamino-4-nitro-2-amino-1-hydroxybenzene | do | dull grey. |
| 8 | 6-chlor-4-nitro-2-amino-1-hydroxybenzene | do | olive green. |
| 9 | 4-methyl-3:5-dichlor-2-amino-1-hydroxybenzene | do | violet. |
| 10 | 4:5-dichlor-2-amino-1-hydroxybenzene | do | reddish blue. |
| 11 | 4:6-dichlor-2-amino-1-hydroxybenzene | do | Do. |
| 12 | 6-nitro-2-amino-1-hydroxybenzene-4-sulfonic acid | do | olive green. |
| 13 | 4-nitro-2-amino-1-hydroxybenzene-6-sulfonic acid | do | green. |
| 14 | 2-amino-1-hydroxybenzene-4-sulfanilide-2'-carboxylic acid | do | greenish grey. |
| 15 | 2-amino-1-hydroxybenzene-4-sulfonic acid | do | violet. |
| 16 | 2-amino-1-hydroxybenzene-4-phenylsulfone-3'-sulfonic acid | do | grey. |
| 17 | 2-amino-1-hydroxybenzene-4-sulfamide | do | blue violet. |
| 18 | 2-amino-1-hydroxybenzene-4-carboxylic acid | do | violet. |
| 19 | 2-amino-1-hydroxybenzene-4-sulfethylanilide-4'-sulfonic acid | do | reddish grey. |
| 20 | 4-chloro-2-amino-1-hydroxybenzene-5-sulfonic acid | do | reddish blue. |
| 21 | 4-methyl-2-amino-1-hydroxybenzene-6-sulfonic acid | do | grey. |
| 22 | 5-nitro-2-amino-1-hydroxybenzene-4-sulfonic acid | do | dull blue green. |
| 23 | 2-amino-1-hydroxybenzene-5-sulfonic acid | do | violet. |
| 24 | 3:4-dichlor-2-amino-1-hydroxybenzene-6-sulfonic acid | do | grey. |
| 25 | 1-amino-4-hydroxybenzene-3-carboxylic acid | do | brown red. |
| 26 | 2-amino-1-hydroxybenzene-4-phenylketone-2'-carboxylic acid | do | violet. |
| 27 | 3:4-dichloro-5-nitro-2-amino-1-hydroxybenzene-6-sulfonic acid | do | violet grey. |
| 28 | 5-chloro-2-amino-1-hydroxybenzene-4-sulfonic acid | do | Do. |
| 29 | 4-amyl-2-amino-1-hydroxybenzene-6-sulfonic acid | do | blue violet. |
| 30 | 4-amyl-6-nitro-2-amino-1-hydroxybenzene | do | greenish grey. |
| 31 | 3:4:6-trichloro-2-amino-1-hydroxybenzene | do | navy blue. |

What we claim is:

1. The complex chromium compound of an azo dyestuff corresponding to the general formula

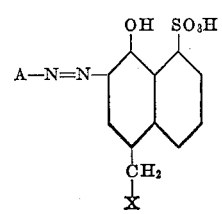

wherein A—N=N— represents the radical of a member selected from the group consisting of diazotised amines of the benzene and naphthalene series containing a lake-forming group in o-position to the amino group and X represents a member selected from the group consisting of hydrogen and a radical of the benzene series.

2. The complex chromium compounds of an azo dyestuff corresponding to the general formula

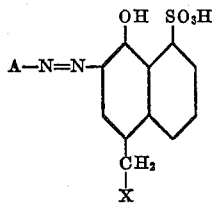

wherein A—N=N— represents the radical of a member selected from the group consisting of diazotised amines of the benzene and naphthalene series containing a lake-forming group in o-position to the amino group and X represents a radical of the benzene series.

3. The chromium complex compounds of an azo dyestuff corresponding to the general formula

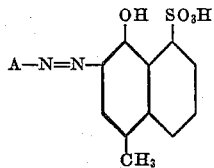

wherein A—N=N— represents the radical of a member selected from the group consisting of diazotised amines of the benzene and naphthalene series containing a lake-forming group in o-position to the amino group.

4. The complex chromium compound of an azo-dyestuff corresponding to the formula

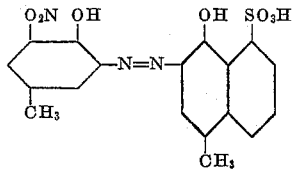

5. The complex chromium compound of an azo dyestuff corresponding to the formula

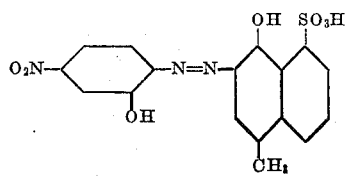

6. The complex chromium compound of an azo dyestuff corresponding to the formula

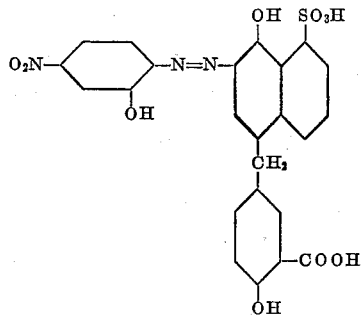

7. The complex chromium compound of an azo dyestuff corresponding to the formula

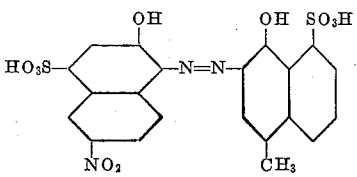

8. The complex chromium compound of an azo dyestuff corresponding to the formula

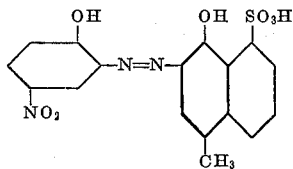

ACHILLE CONZETTI.
GUIDO SCHETTY.

REFERENCES CITED

The following references are of record in the file of this patent:

UNITED STATES PATENTS

| Number | Name | Date |
| --- | --- | --- |
| 303,335 | Spiegel | Aug. 12, 1884 |
| 863,290 | Laska | Aug. 13, 1907 |
| 2,034,390 | Crossley | Mar. 17, 1936 |
| 2,038,942 | Kopp | Apr. 28, 1936 |
| 2,090,938 | Conrad | Aug. 24, 1937 |
| 2,111,270 | Moll | Mar. 15, 1938 |
| 2,181,051 | Fleischhauer | Nov. 21, 1939 |
| 2,268,936 | Hasler | Jan. 6, 1942 |
| 2,405,816 | Conzetti | Aug. 13, 1946 |
| 2,418,416 | Locke | Apr. 1, 1947 |
| 2,451,579 | Schetty | Oct. 19, 1948 |

FOREIGN PATENTS

| Number | Country | Date |
| --- | --- | --- |
| 636,356 | Germany | Oct. 7, 1936 |